United States Patent [19]

Cannon

[11] 4,053,878

[45] Oct. 11, 1977

[54] METHOD AND APPARATUS FOR IMPROVING THE CLARITY AND CHARACTER DENSITY ON A DOT MATRIX VIDEO DISPLAY

[75] Inventor: Jack W. Cannon, Boca Raton, Fla.

[73] Assignee: International Business Machines Corporation, Armonk, N.Y.

[21] Appl. No.: 617,889

[22] Filed: Sept. 29, 1975

[51] Int. Cl.² .................................................. G06F 3/14

[52] U.S. Cl. ................................ 340/324 AD; 178/15; 358/133

[58] Field of Search .................... 340/324 A, 324 AD; 178/15, 30; 358/133, 138

[56] References Cited

U.S. PATENT DOCUMENTS

| | | | |
|---|---|---|---|
| 3,426,344 | 2/1969 | Clark | 340/324 AD |
| 3,444,319 | 5/1969 | Artzt et al. | 340/324 AD |
| 3,471,848 | 10/1969 | Manber | 340/324 AD |
| 3,480,943 | 11/1969 | Manber | 340/324 AD |
| 3,903,517 | 9/1975 | Hafner | 340/324 AD |
| 3,928,845 | 12/1975 | Clark | 340/324 AD |

*Primary Examiner*—Marshall M. Curtis
*Attorney, Agent, or Firm*—John C. Black; D. Kendall Cooper; J. Jancin, Jr.

[57] ABSTRACT

A method and apparatus is shown for improving the clarity and character density on a cathode ray tube (CRT) display in which characters are formed row by row from discrete character elements in row and column coordinate matrices. Unblanking signals form the discrete character elements no less than two matrix spaces wide every time an unblanking signal is applied. This technique results in a much crisper appearance to the characters on the screen and permits as many as 128 characters per line using a low cost commercially available television (TV) monitor. A random access storage is used to store dynamically the addresses of positions (locations) of a read only store corresponding to characters to be displayed. The read only store (ROS) contains indicia corresponding to the discrete character elements of a plurality of characters, one set of indicia for each character in the desired character set. Each addressable location of the ROS stores unblanking indicia (a plurality of bits) for the discrete character elements of one row of a character. The random access store in conjunction with timing means selects the ROS locations in sequence to form a row of characters on the display in accordance with the data read from the ROS. As each row of unblanking indicia or data is read from the ROS, it is entered into a shift register for transfer to the unblanking circuit of the display in bit serial form. Timing of the stores and shift register is controlled by a clock and suitable frequency dividers.

10 Claims, 76 Drawing Figures

METHOD AND APPARATUS FOR IMPROVING THE CLARITY AND CHARACTER DENSITY ON A DOT MATRIX VIDEO DISPLAY

BACKGROUND OF THE INVENTION

This improvement relates to a method and means for improving character clarity and character density in a cathode ray tube display. The frequency response characteristics of CRT video displays significantly affect the price of the display; cost increases significantly with increases in the quality of the frequency response. State-of-the-art cathode ray tube displays are frequently limited to the range of 40 to 48 characters per line.

There are frequency restrictions associated with state-of-the-art cathode ray tubes for alphanumeric character displays. The quality of alphanumeric character displays on a television monitor is restricted by the maximum Z-modulation frequency at which the video response falls below 3 dB, as well as being restricted by the change in video response for a given change in the modulation frequency.

For point-to-point unblanking with maximum character density per line, the system must frequently be operated at the point which creates the greatest response change for a given frequency change. For instance, the upper bar of a "T" will appear brighter than the adjacent vertical components making up the remainder of the letter. The use of a dot (discrete charater element) matrix unblanked display permits use of the same fundamental frequency for all horizontal and vertical segments of characters, but this fundamental frequency is often 5 to 14 times the lowest fundamental frequency composing a specific character.

Typical state-of-the-art video monitors utilize a horizontal sweep frequency of approximately 15.75 KHz and exhibit an 8 MHz Z-modulation cut-off frequency. Due to retrace time and inherent linearity restrictions, only 66 to 75 percent of the sweep is available for displaying alphanumeric characters and symbols. In terms of sweep time, this results in approximately 42 to 48 microseconds available for Z-modulation unblanking.

Typical dot matrices are 5, 7, or 9 spaces wide and 7, 8, or 9 spaces high. Character density increases inversely with matrix size while character definition increases directly with matrix size. In order to properly display a 64 EBCDIC or ASCII character set, a matrix no less than 7 spaces wide must be chosen. A 5 space wide matrix results in a poorly defined 48 character set.

It is, therefore, an object of the present invention to provide a method and means to improve both the clarity and density of characters displayed on a CRT.

It is another object to improve the appearance of the characters displayed.

SUMMARY OF THE INVENTION

These objects are achieved in a preferred form of the invention by always applying unblanking signals in two or more consecutive character element spaces. An unblanking signal for one character element space is prohibited; however, single blank spaces between character elements is not only permitted but is used to permit the overlapping of double character elements from row to row in a character. This significantly improves the character format and appearance.

The matrix chosen for the preferred embodiment is 8 spaces wide by 7 spaces high. Each character matrix is stored in the ROS and is set up so that a group of dots (a bar) on the CRT face is defined to be at least 2 consecutive bits and a maximum of 8 bits in width, so that no single bit can exist by itself within the matrix. It must have at least one adjacent bit coexisting in its particular row. Each bit can be further defined as a matrix element or a positional unit. This limits the frequency variation to four times the minimum fundamental frequency within a given character. All characters within a character set can be described with this matrix. These bits can be stored directly in the ROS and are typically read out 8 bits or one row at a time. This allows the bits to be loaded into a shift register and shifted out at the appropriate frequency. The shift frequency is chosen to be four times the maximum desired Z-modulation frequency. Therefore, a maximum desired Z-modulation frequency of 8 MHz requires a shift frequency of 32 MHz. This particular frequency can produce a density of 128 characters per line.

A random access storage (RAS) stores the characters in a convenient digital format such as EBCDIC. This storage feeds the ROS which acts as a character generator and, in turn, loads the shift register. The output of the shift register ultimately becomes the Z-modulation signal to be fed to the video monitor or line driver. The frequency of the clock is selected depending on the display parameters, such as the number of characters per line, type of display, etc., and directly controls the shifting of the shift register.

A divide by N circuit controls the loading of the shift register and the incrementing of the storage address register (SAR). N is selected depending on the number of time units within the horizontal spacing of a character position. The low order portion of SAR is selected by the number of characters per line. One hundred twenty-eight characters per line requires 7 bits.

A row counter controls which portion of the character is addressed in ROS. The high order portion of SAR is determined by the number of lines of characters, 24 lines requiring 5 bits. A sync generator provides the necessary circuitry to blank the screen and produce the combined sync signal.

The foregoing and other objects, features and advantages of the present invention will be apparent from the following more particular description of the preferred embodiment of this invention as is illustrated in the accompanying drawings.

DESCRIPTION OF THE PREFERRED EMBODIMENT

Figure 1:
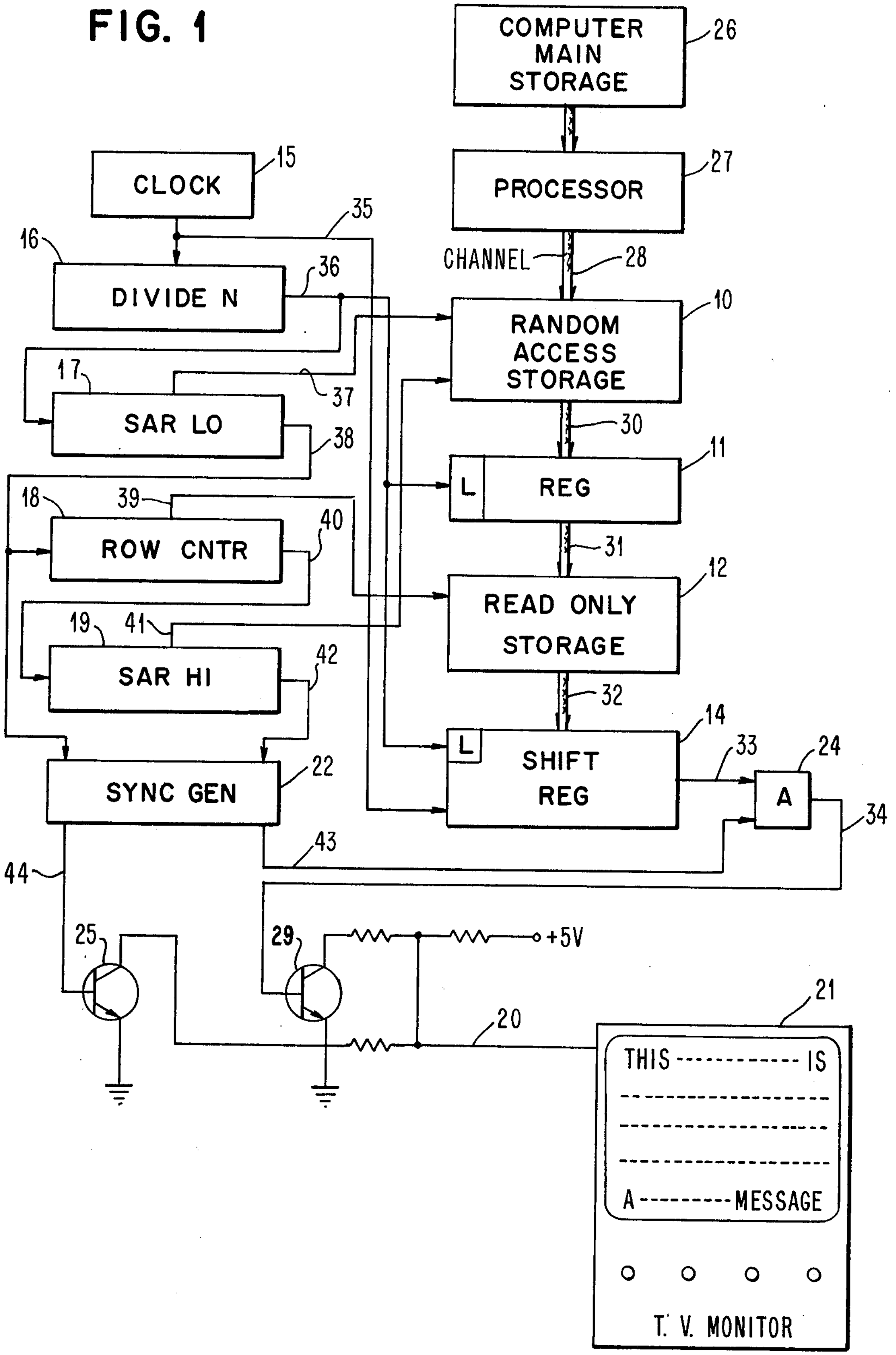
FIG. 1 is a fragmentary diagrammatic representation of a video display incorporating the teachings of the present invention.

Typical state-of-the-art video monitors utilize a horizontal sweep frequency of approximately 15.75KHz. When used as a computer system output device for the purpose of displaying alphanumeric characters, the inherent linearity restrictions and unusable retrace time, limit the available display area to approximately 66 to 75 percent of the sweep. In terms of sweep time this results in approximately 42 to 48 microseconds available for Z-modulation unblanking.

The maximum Z-modulation frequency is defined as that frequency which the response of the TV monitor falls 3 dB. This response is measured at the face of the cathode ray tube (CRT) in terms of diminishing intensity as a function of increasing frequency. This response is normally quite linear within the low and medium frequency range and deteriorates fairly rapidly when subjected to high frequency Z-modulation. A typical maximum Z-modulation frequency is 8 MHz.

The width of an individual dot displayed on the screen is directly proportional to one-half the time period of the modulating signal when operating within the low and medium frequency ranges. However, when the modulation of the Z-axis is operated at the higher frequencies it is the intensity which varies directly proportional to one-half the time period of the modulating signal.

A typical and convenient approach to forming an alphanumeric character on a CRT face is through the use of a row and column dot matrix in which each row of the character matrix is produced on an individual sweep line and each dot within a row is produced by the "ON" component of the individual pulses of the unblanking signal, so that the higher the frequency the greater the number of available dots to work with.

It is usually desirable to produce as many characters as possible on a given line. The restricting factors are: finite size, character aspect ratio, the available sweep time, the maximum Z-modulation frequency, and the number of dots necessary within the horizontal plane of an individual character to adequately distinguish the individual characters of a given character set.

Typical dot matrices are 5, 7, or 9 spaces wide and 7, 8, or 9 spaces high. Character density increases inversely with matrix width while character definition increases directly with matrix width. In order to properly display a 64 character EBCDIC or ASCII set, a matrix no less than 7 spaces wide must be chosen. A 5 space wide matrix results in a poorly defined 48 character set.

If a 5 space wide matrix is chosen, so that a maximum of 5 distinct dots appear along with 3 blank dot positions inserted between characters for separation, a maximum character density of 40 to 48 characters per line will result. This is a low density character line, as well as a low volume character set. As the matrix width is increased the character density is correspondingly decreased.

An attempt could be made to increase the character density by not turning the beam off between adjacent dots. In this case the beam would be turned "ON" at a particular starting position and allowed to remain "ON" until a particular stopping position. In this case a horizontal component of a character would be made up of a continuous bar instead of a series of dots. Also, a single dot would then be twice as wide as normal which would allow the possibility of scaling everything to one-half its previous value or twice the previous character density. However, these characters would then be made up of a wide variety of frequencies and consequently varying intensities. As an example, the low frequency component of the horizontal bar of the character "T" will appear considerably brighter than the vertical component which is made up of several high frequency components. The best ratio of maximum width to minimum width of individual components within the displayed character possibly obtainable is with the 5 space wide low volume character set. In this case, the worst possible ratio is 5 to 1. This ratio varies directly with the width of the selected matrix. It is desirable to have this ratio as low as possible for uniform intensities within the displayed character.

One method of modulation which results in a 1 to 1 ratio, a high volume character set (64), and a medium character density (64 to 80 characters per line) when operated at the maximum Z-modulation frequency, is to use a 7 space wide matrix with the restriction that any single "ON" bit must always be followed horizontally by an "OFF" bit. A dot on the screen is formed by turning the beam on at the beginning of the bit position and then off at the end of the bit position and then insuring that it remains off for at least an entire bit position. This allows a maximum of four dots to be printed in the horizontal plane of a character set while still allowing any single dot to appear at any of seven discrete matrix positions. This technique results in the possibility of forming an entire high volume character set with any single character occupying only that portion of the screen which normally would produce only four distinct dots. Assuming an 8 MHz cut-off frequency, a feasible character density upper limit is 80 characters per line.

The example matrix chosen for this invention is 8 spaces wide by 7 spaces high. There are two essential rules which must be followed while constructing a character within this matrix. The first rule is that any bit within the matrix designated "ON" requires at least one horizontally adjacent bit also designated "ON", such that no single "ON" bit can exist by itself. It must have at least one more "ON" bit horizontally concatenated to it.

The second rule is that the CRT beam is turned on whenever an "ON" bit is encountered horizontally. This beam is forced to remain "ON" until an "OFF" bit is encountered horizontally. It is then turned off.

Figure 4:
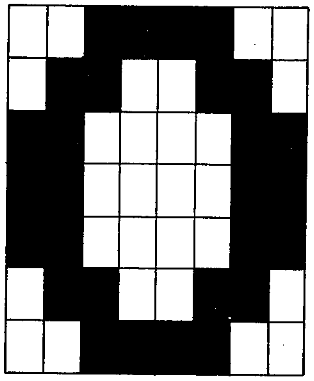
FIGS. 4–74 show a preferred character set.
Figure 5:
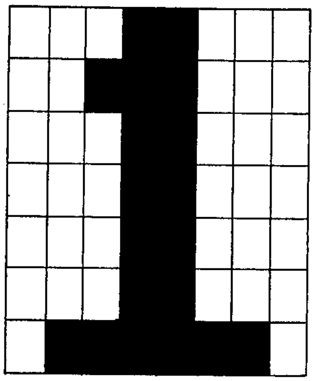
Figure 6:
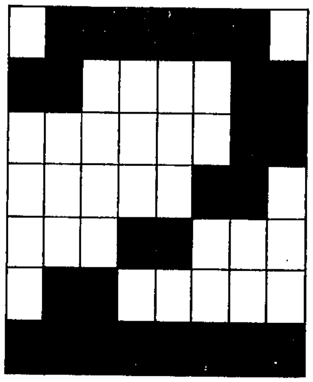
Figure 7:
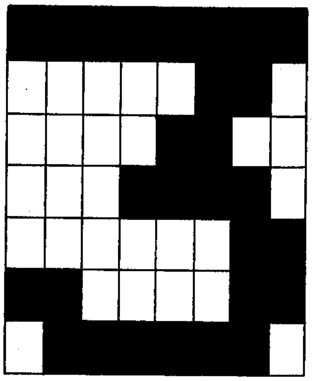
Figure 8:
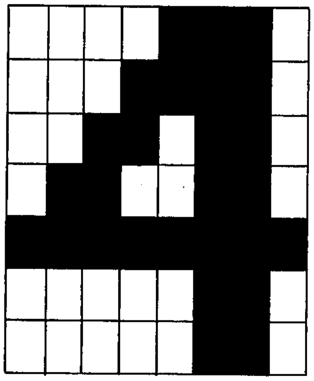
Figure 9:
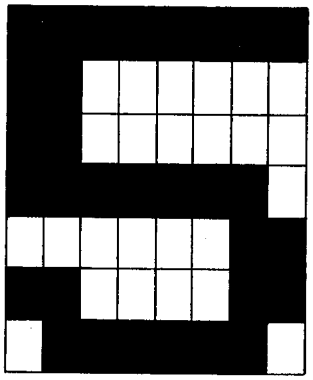
Figure 10:
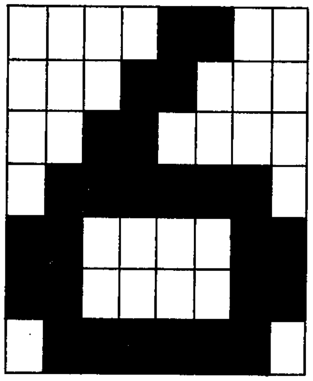
Figure 11:
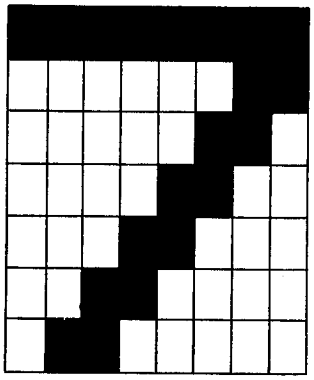
Figure 12:
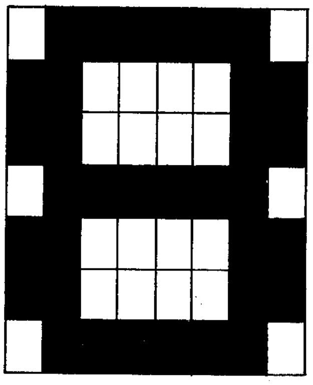
Figure 13:
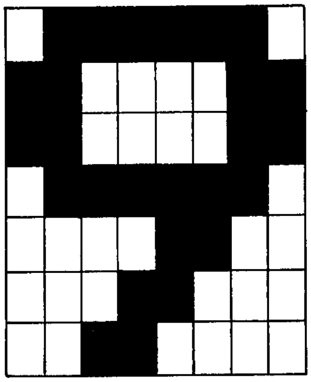
Figure 74:
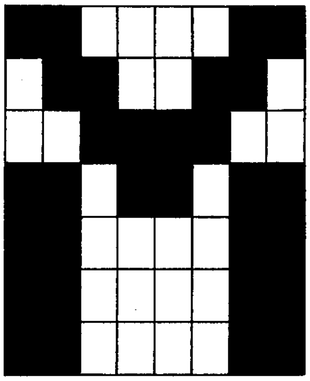

FIGS. 4 through 74 represent the construction of a high volume character set in accordance with the above rules.

Figure 35:
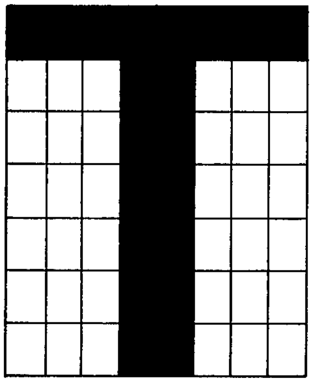
Figure 36:
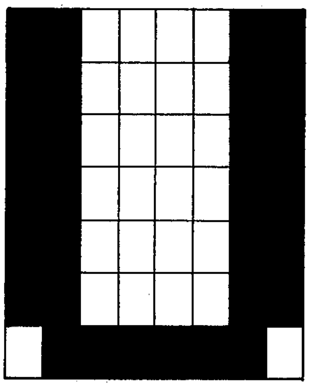
Figure 37:
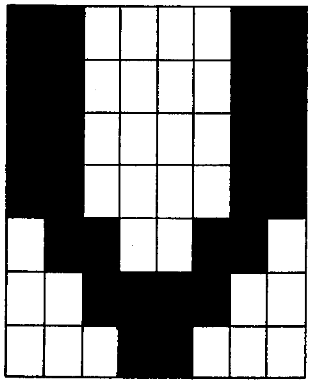
Figure 38:
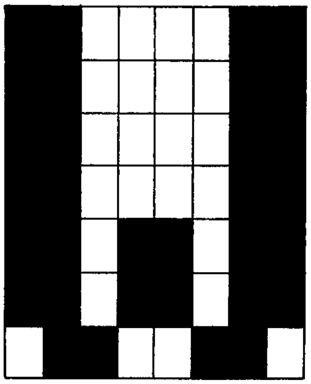
Figure 39:
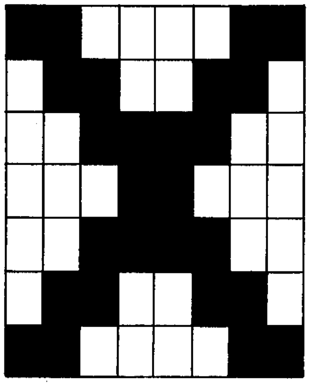
Figure 40:
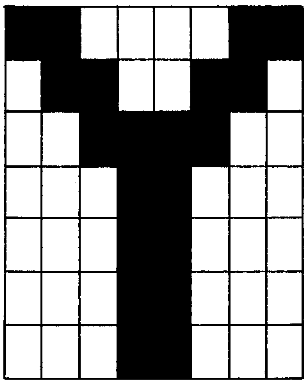
Figure 41:
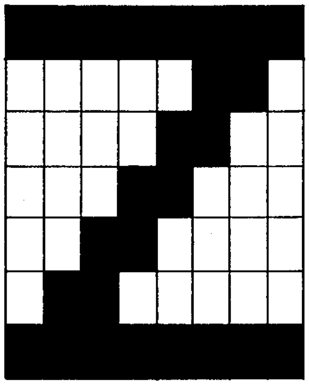
Figure 42:
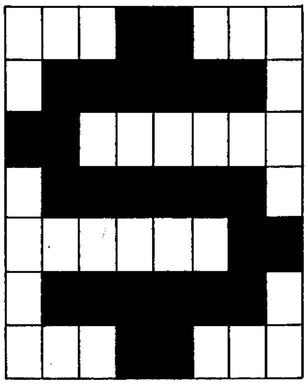
Figure 43:
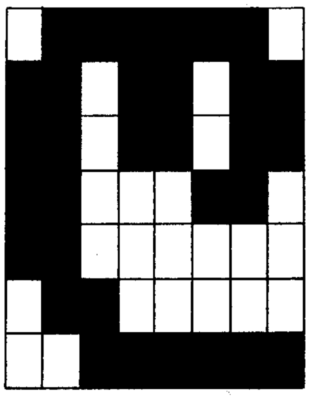
Figure 44:
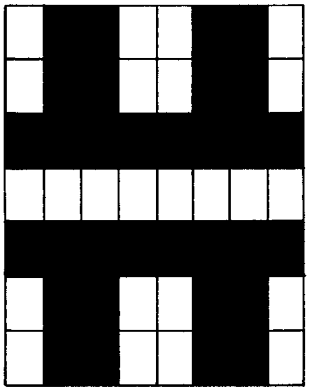
Figure 45:
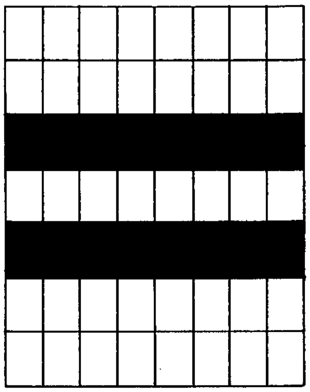
Figure 46:
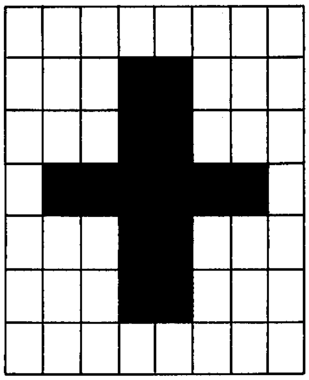
Figure 47:
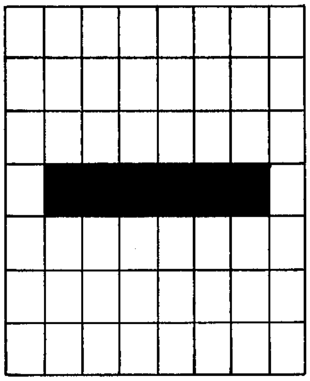
Figure 48:
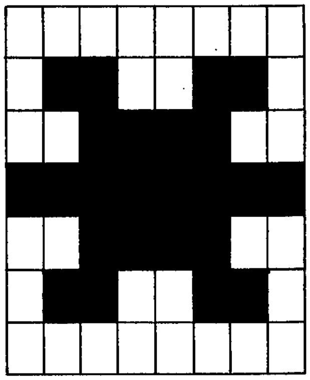
Figure 49:
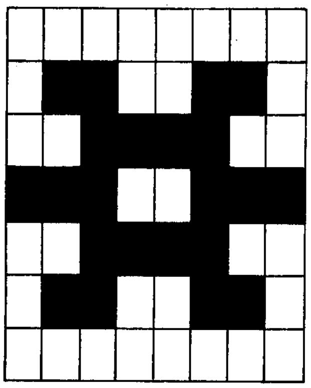
Figure 50:
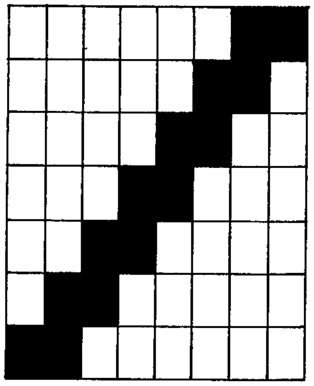
Figure 51:
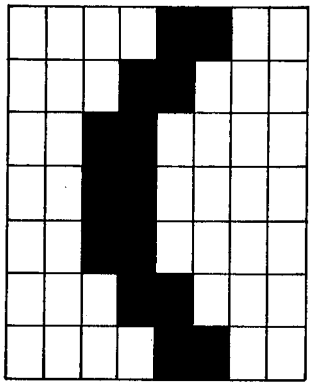
Figure 52:
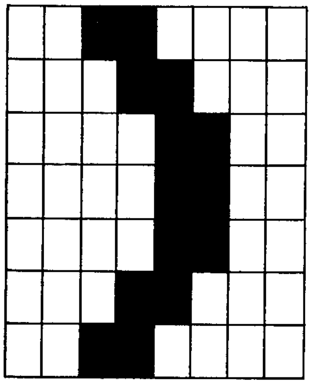
Figure 53:
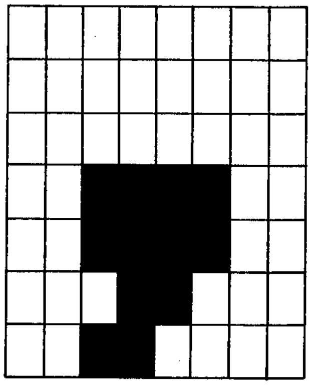
Figure 54:
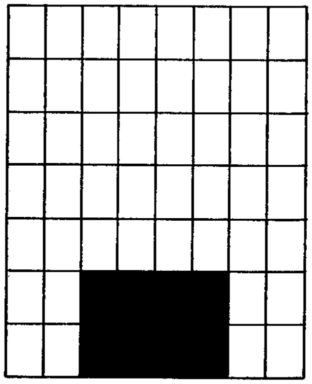
Figure 55:
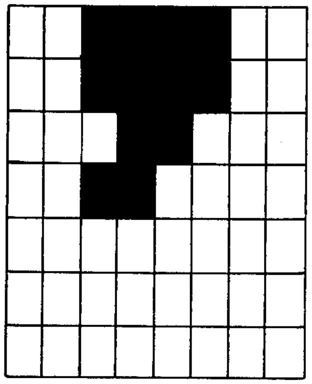
Figure 56:
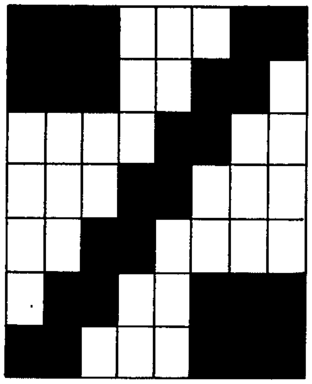
Figure 57:
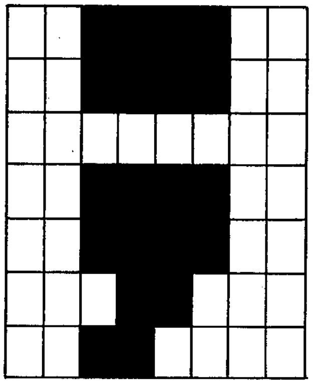
Figure 58:
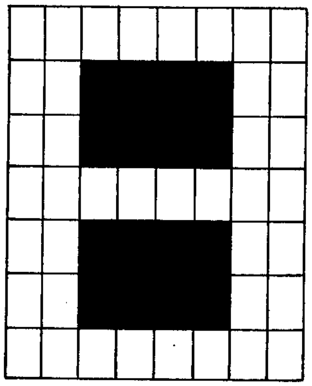
Figure 59:
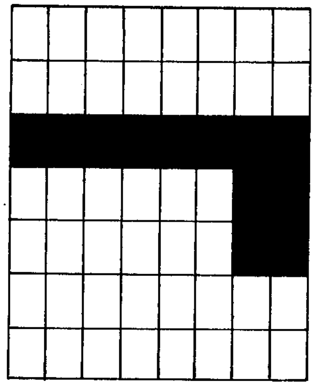
Figure 60:
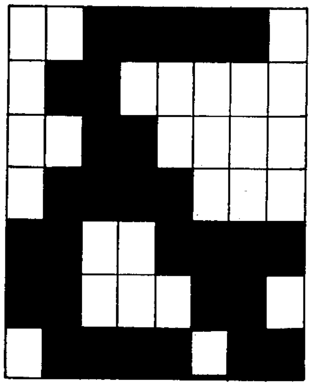
Figure 61:
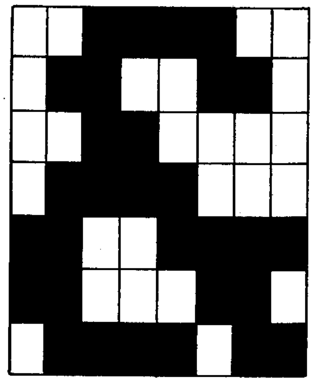
Figure 62:
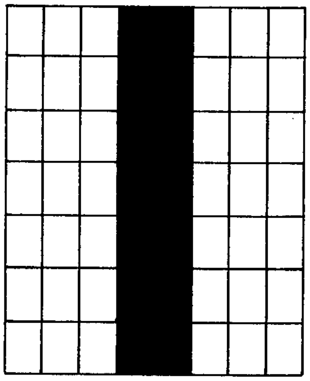
Figure 63:
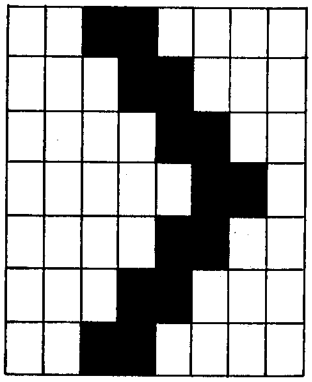
Figure 64:
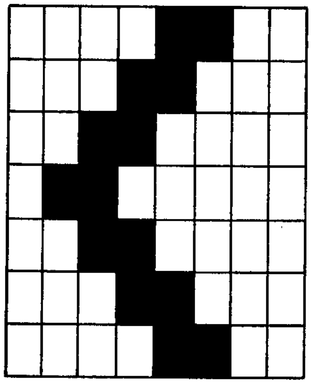
Figure 65:
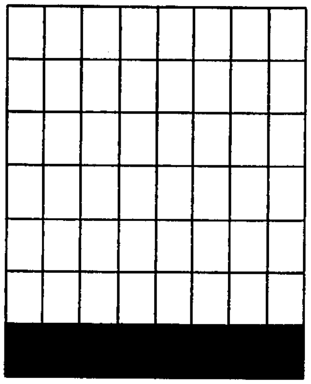
Figure 66:
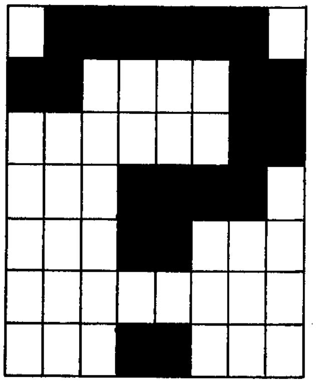
Figure 67:
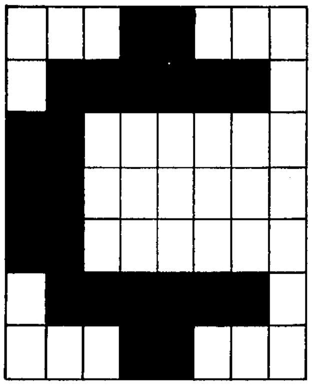
Figure 68:
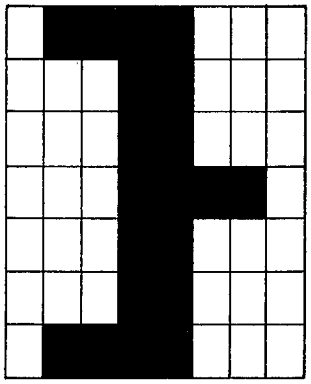
Figure 69:
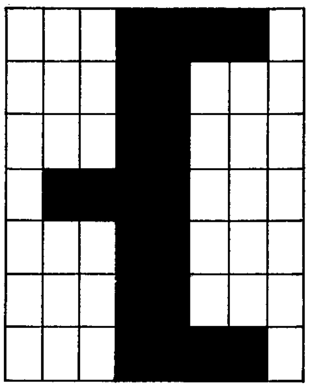
Figure 70:
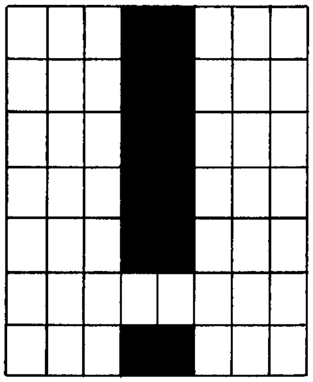
Figure 71:
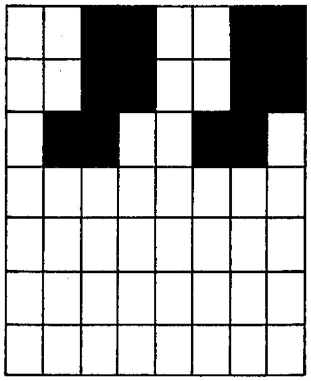
Figure 72:
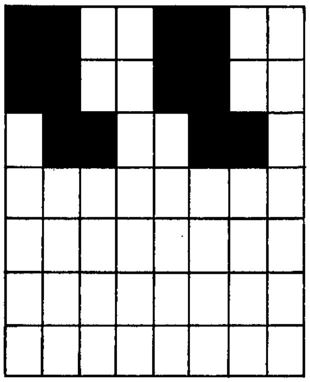
Figure 73:
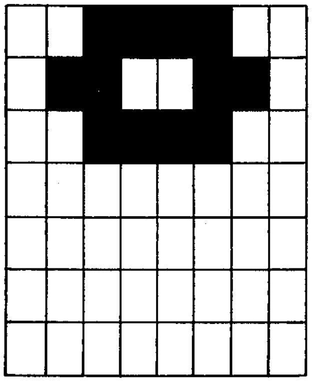

Refer to FIG. 35. The character "T" illustrates two important points. One is that, even though a matrix that is an even number of bits wide has been chosen to construct the character within, the character is symmetrical around its central axis. Each side of the horizontal segment extends an equal distance in either direction from the vertical segments, while the character occupies its complete allocated width. This prevents both lopsided characters and formation of characters composed of a variety of widths. Normally, an odd matrix is utilized to accommodate these desired attributes.

The second point of particular interest regarding FIG. 35 concerns the ratio of the maximum time pulse to the minimum time pulses composing this character. The horizontal bar in row 1 is composed of the maximum time pulse possible and is 8 bits wide. Each element of the vertical bar occupying columns 4 and 5 of rows 2 through 7 is composed of the minimum time pulse possible and is 2 bits wide. This insures a relatively small and acceptable ratio of 4 to 1 for the worst case frequency variations composing a single character without requiring the additional bandwidth necessary for turning the beam off after each dot position.

Figure 25:
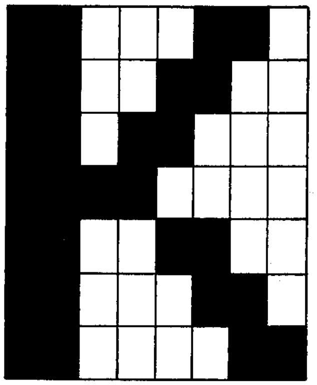
Figure 26:
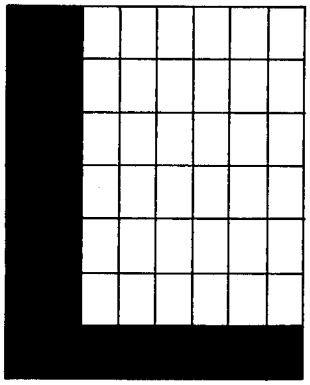
Figure 27:
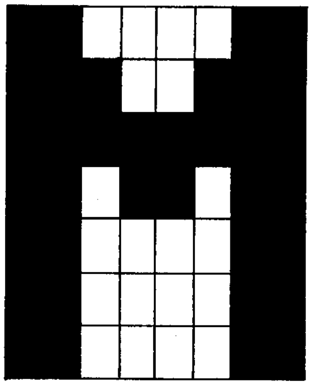

Refer to FIG. 25. The character "K" also illustrates two important points. Notice the two equally spaced dots in both row 2 and row 5. Each dot occupies the minimum 2 bits and has an equal amount of "OFF" time following its "ON" time. This graphically illustrates the fact that if one assumes equal "OFF" and "ON" times then only two distinct dots can be printed within the horizontally allocated space for a single character. Conversely, by utilizing the techniques described within this invention, it is possible to adequately portray any member of a high volume character set and display that character within only that display area normally consumed by printing two distinct dots.

Figure 28:
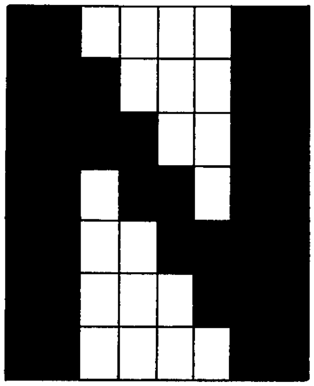

The second point of concern within FIG. 25 is on row 3. An "OFF" position only one matrix space wide is illustrated in Column 3. Although this "OFF" time is only one-half the minimum defined "ON" time, this does not violate the previously established rules which apply specifically to "ON" time. This situation occurs several times throughout the illustrated character set (FIGS. 4 through 74), in particular, on the character "N" (FIG. 28) row 4. It is apparent that these components of the individual characters would not go totally "OFF" when operated at the maximum Z-modulation frequency. This is actually a positive attribute of the invention. While the area of concern does not go completely "OFF" at these times, it does dim out to some extent. Therefore, when a slash joins a vertical segment of a character, it appears to do so with a much sharper and distinguishable acute angle than previously obtainable.

Figure 29:
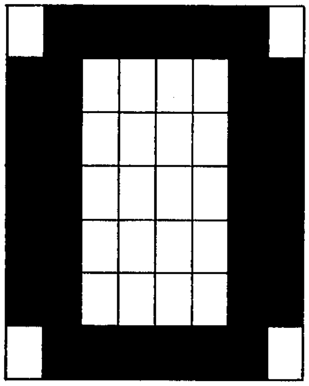
Figure 30:
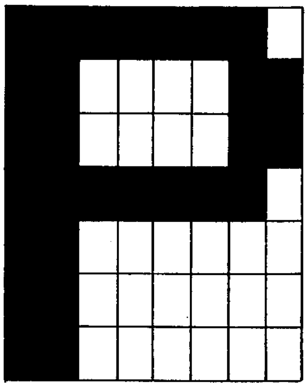
Figure 31:
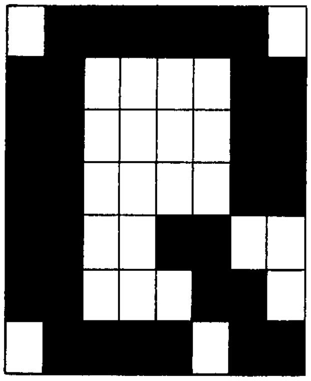
Figure 32:
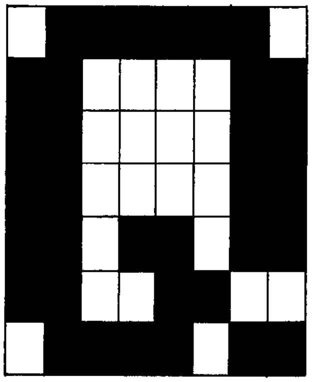
Figure 33:
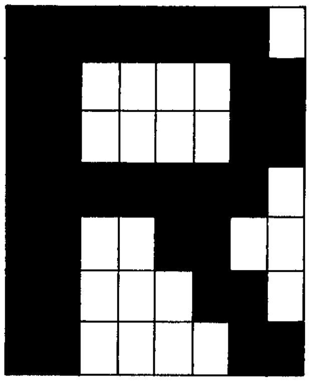
Figure 34:
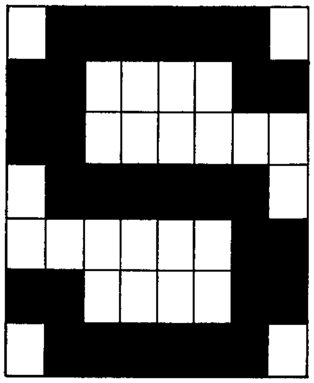

Refer to FIG. 29. The character "0", rows 1 and 7, columns 1 and 8, also show an example of "OFF" positions occupying only a single matrix space. However, in this case the beam goes completely off since the single matrix space of concern is concatenated to the approximately 4 adjacent spaces necessary for character separation. The advantage in this case is that the edges of those characters, which require rounded corners, can be constructed with a smoother degree of rounding off than most conventional techniques allow.

Figure 15:
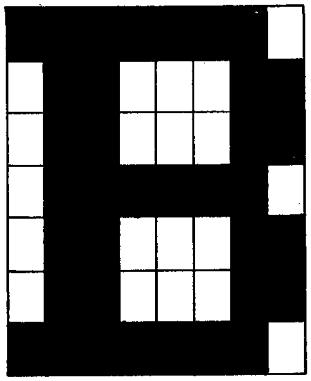
Figure 16:
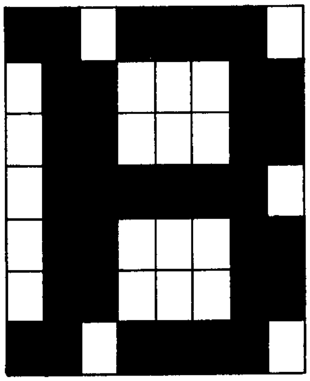

The use of this invention is not restricted to high density character lines. It is highly advantageous to use this invention for displaying low and medium density character lines. When using this invention for displaying 128 characters per line the maximum Z-modulation frequency is 8 MHz. This frequency (8 MHz) is approximately the maximum allowable for typical TV monitors. When using this invention for lower character densities the maximum applied Z-modulation frequency is correspondingly reduced. If a density of 64 characters per line is chosen, the maximum applied Z-modulation frequency is only 4 MHz. This is a relatively low frequency and the end result is that the displayed picture is considerably brighter, crisper and clearer than other pictures produced by presently employed techniques. In some cases, it is desirable to change the character formation bit pattern depending on the character density chosen. FIG. 16 shows a "B" when printed on a 128 character density line. The single matrix space "OFF" position located in column 3 rows 1 and 7, is used to help form small desirable curves on the left side of the character. However, as the character density is reduced this "OFF" position becomes more evident and eventually the character takes on a spotty appearance. In this case the matrix pattern shown in FIG. 15 could be used instead.

Implementation of this invention can be accomplished through the use of binary logic circuits, and is shown as such within this embodiment.

Figure 3:
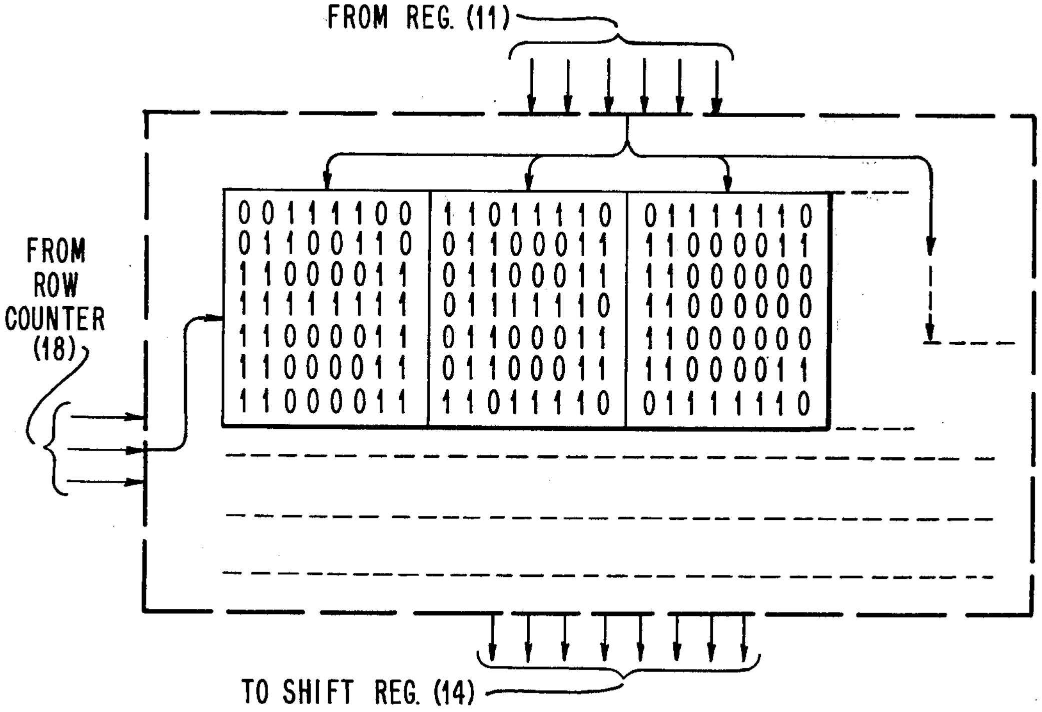
Figure 14:
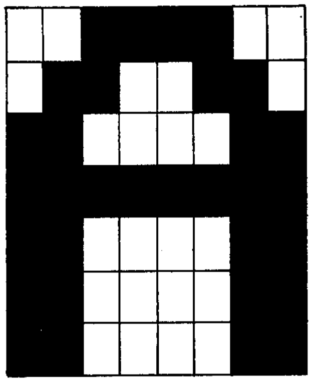
Figure 17:
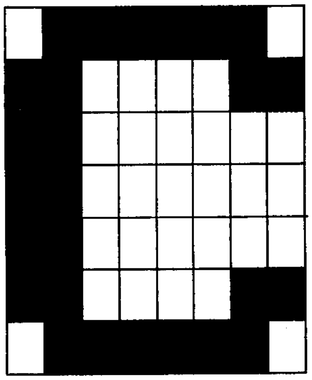
Figure 18:
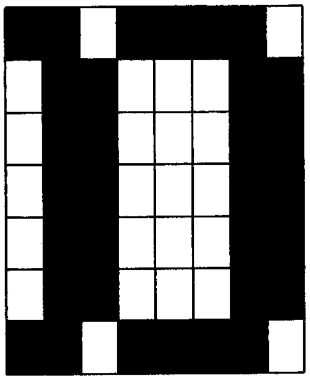
Figure 19:
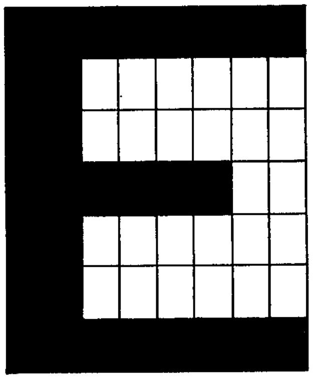
Figure 20:
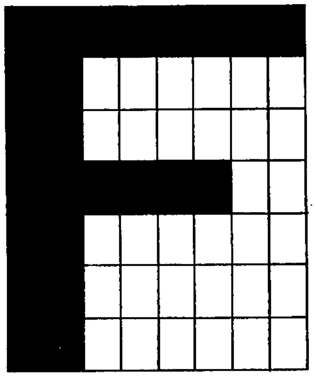
Figure 21:
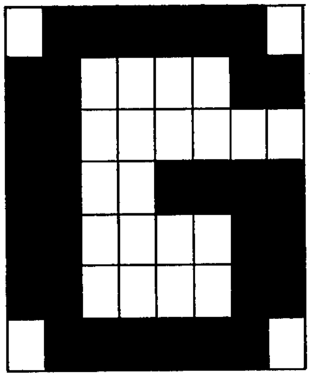
Figure 22:
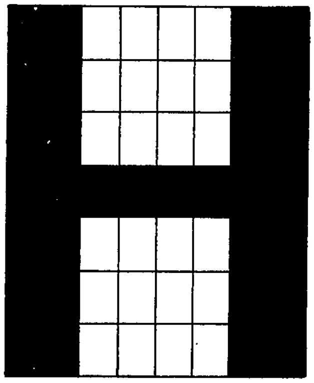
Figure 23:
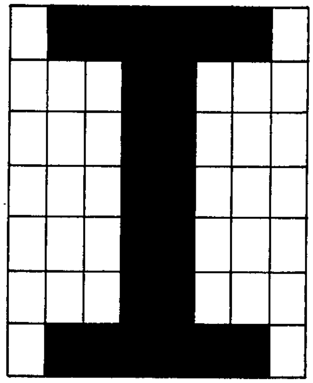
Figure 24:
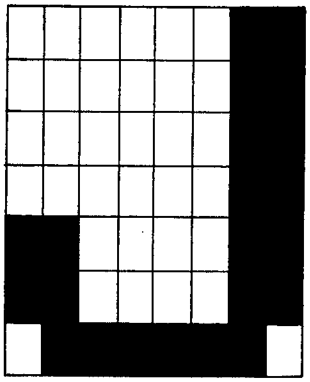

The specific bit pattern used for character formation is stored in a Read Only Storage (ROS). This is a well known and commonly used technique. FIG. 3 illustrates a possible storage pattern. The output of the ROS is 8 bits or one complete row of a specific character. Therefore, a 64 character set is assumed. The input of the ROS requires a total of nine bits. Six are a code used to find the specific character and three are used to find the specific row of that character. The ON/OFF requirements of the CRT beam are represented within the ROS in a 1/100 manner. If the beam is required to be "ON" in a certain area a "1" bit is inserted in the ROS; if the beam is "OFF" in that area, a "$\phi$" is inserted. The bit pattern used for an "A", "B", and "C" is illustrated within FIG. 3. Careful examination shows that these bit patterns are identical to those illustrated in FIGS. 14, 16, and 17.

Figure 2:
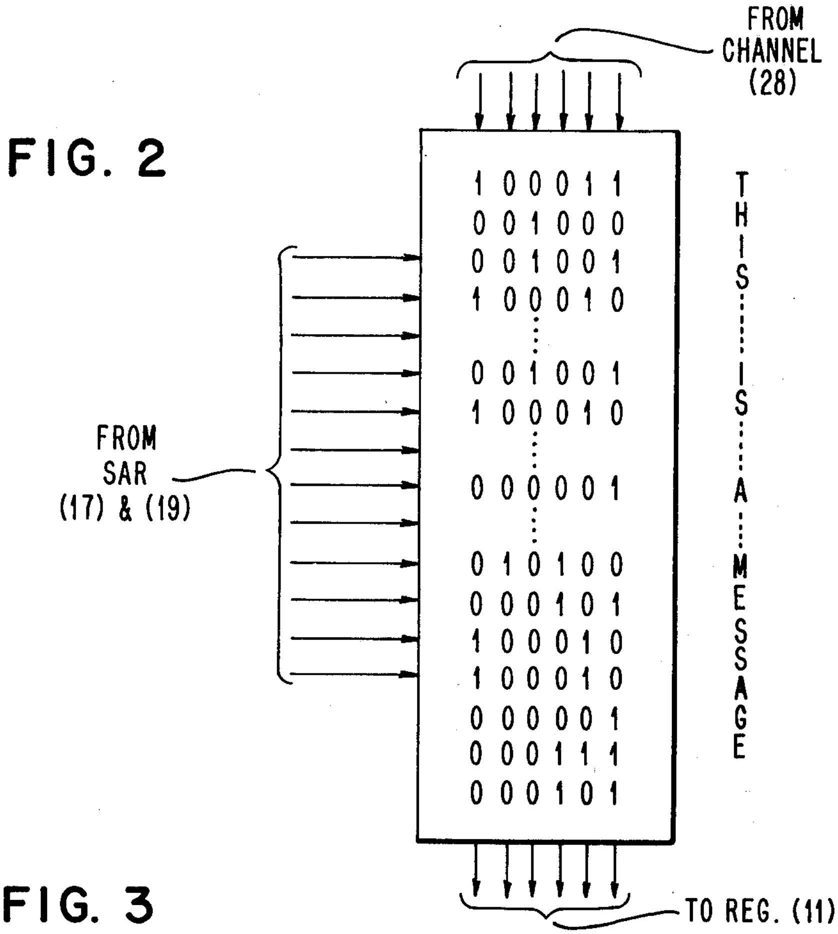
FIGS. 2 and 3 are fragmentary illustrations of the random access storage and the ROS of FIG. 1.

A code for the specific character to be displayed is stored in a Random Access Storage (RAS). This code is fetched from storage at the appropriate display time and ultimately becomes an input to the ROS. FIG. 2 shows a layout of the RAS. The output is six bits which correspond to the code input to the ROS. The input to the RAS is also six bits and is connected to an appropriate loading facility normally referred to as a channel. A separate storage location exists within the RAS for each unique location on the CRT screen that a character can be displayed. The code within this location identifies the specific character to be displayed at that location. FIG. 2 shows such an arrangement of six bit EBCDIC codes with their appropriate alphanumeric symbols shown to the side.

A Storage Address Register (SAR) is used to address a location within the RAS. The illustrated example requires 12 SAR bits. The low order 7 bits correspond to a character density of 128 characters per line, and are referred to as SAR-LO. The high order 5 (SAR-HI) bits correspond to the number of character lines. In this example, 24 lines of characters are utilized. SAR is sequentially incremented in a manner synchronous to the CRT sweep frequencies.

FIG. 1 shows a complete block diagram of the binary circuits required for a possible implementation of this invention. A computer's central processor 27 is shown, which retrieves the characters to be displayed from its main storage 26 and presents them to an interface channel 28 for initial loading of the RAS 10 using any of the many commonly used and well-known techniques.

Figure 75:
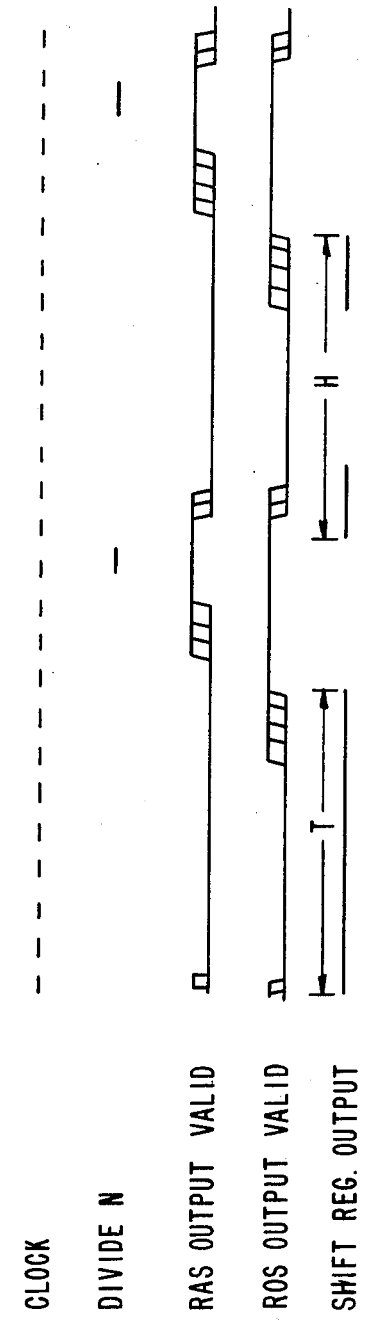
FIGS. 75 and 76 are timing diagrams.

When the RAS 10 is accessed at the appropriate time, its six bit output 30 is loaded into a register 11 for temporary storage. The six bit output 31 of this register 11 is used to access the ROS 12. The eight bit output 32 of the ROS 12 containing row information of the specific character, is loaded in parallel into the shift register 14. The appropriate shift frequency is applied to the shift register 14 to form the serial data signal at output 33. Horizontal spacing between characters is accomplished by delaying the loading of the shift register 14 an appropriate time after all data bits have been shifted out. In this example the 8 data bits are followed by 4 dummy shifts prior to reloading the shift register 14. This is accomplished by the clock 15, whose frequency is chosen to be 4 times the maximum allowed Z-modulation frequency. The clock 15 frequency is chosen to be approximately 32 MHz for this example. The single line clock output 35 directly controls the shifting of the shift register 14 and is frequency divided by divide N circuit 16 for the purpose of loading register 11 and shift register 14 and driving SAR-LO circuit 17. Divide N circuit is a divide 12 circuit for our example and has a single line output 36. FIG. 75 is a timing diagram showing these relationships. The shift register output 33 is shown printing the first row of a "T" followed immediately by the first row of an "H".

Figure 76:
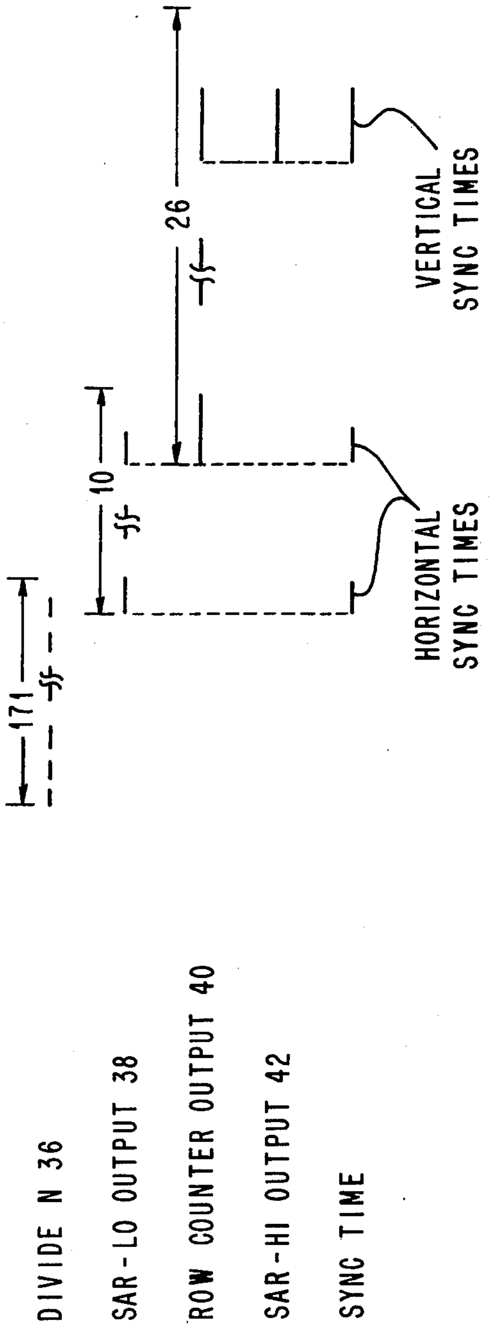

FIG. 76 shows a timing diagram for the remainder of the logic. A density of 28 characters per line is assumed for this example. It should be noted that the display is always trying to display the characters stored in RAS 10. No provision exists in this implementation for totally blanking the display. If a blank display is desired, such controls must be added or RAS 10 must be loaded with blank characters.

Controls for the RAS 10 and ROS 12 are arranged so that on a single sweep of a scan line of the CRT, the first row of each character within the character line is printed. On the next sweep, the second row will be printed and so forth for subsequent sweeps. SAR-LO 17 is a frequency divider with a seven stage binary output 37 used in addressing RAS 10. A single additional output 38 is used for incrementing the row counter 18 and providing stimulus to the sync generator 22 at the appropriate time. The row counter 18 is a binary frequency divider with a three stage output 39 used to address ROS 12. A single output 40 is used to increment SAR-HI 19. SAR-HI 19 is a binary frequency divider with a five stage output 41 used to address RAS 10. A single stage output to the sync generator 22 is used to provide vertical sync information.

The sync generator 22 has a single output 43 to the AND gate 24. The single line output 34 of the AND gate 24 is the unblanking signal. Another single line output 44 of the sync generator 22 provides the horizontal and vertical synchronizing signal. The synchronizing signal 44 is combined with the unblanking signal 34 using semiconductor driver 25 and semiconductor driver 29 respectively, to produce the well-known and commonly used composite video output signal 20. This signal 20 is a single line output applied directly to the commercially available TV monitor 21.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A method for improving the clarity and density of displayed characters in a cathode ray tube character display system in which the character format is formed by an M-wide row and N-high column coordinate matrix and characters to be displayed are built up row by row from discrete character elements which are identified within the matrix by character generating data bits applied to an unblanking circuit in the system, said method comprising the steps of providing a memory means having character generating data bits arranged only in groups of two or more consecutive unblanking bits, and applying said character generating data bits from the memory means to the unblanking circuit at a frequency rate between two and four times the maximum Z-modulation frequency of the cathode ray tube character display system to produce a continuous character element for each unblanking bit group, thereby producing a four wide by seven high character element matrix.

2. The method of claim 1 wherein the ratio of maximum to minimum consecutive unblanking bits arranged in said groups is limited to four to one.

3. The method of claim 1 wherein the matrix is eight character generating data bits wide by seven character generating data bits high, whereby the only row display area required on the cathode ray tube for each character in a sixty-four character EBCDIC or ASCII set is the required for four minimum width continuous character elements.

4. The method of claim 1 further comprising the steps of arranging the unblanking bit groups in adjacent rows to be selectively overlapped so as to cause selective overlapping of adjacent character elements in adjacent rows of a displayed character to improve the character format.

5. The method of claim 3 further comprising the steps of arranging the unblanking bit groups in adjacent rows to be selectively overlapped so as to cause selective overlapping of adjacent character elements in adjacent rows of a displayed character to improve the character format.

6. Apparatus for improving the clarity and density of displayed characters in a cathode ray tube character display system in which the character format is formed by an M-wide row and N-high column coordinate matrix and characters to be displayed are built up row by row from discrete character elements which are identified within the matrix by character generating data bits applied to unblanking circuits in the display system, said apparatus comprising memory means for producing character generating data bits only in groups of at least two consecutive unblanking bits, and means for controlling the application of the character generating data bits from the memory means to the unblanking circuits at a frequency rate of at least twice the maximum Z-modulation frequency of the cathode ray tube character display system, whereby a continuous character element corresponding to each unblanking bit group is produced.

7. The apparatus of claim 6 wherein the matrix is eight character generating data bits wide by seven character generating data bits high, whereby the only row display area on the cathode ray tube required for each character in a sixty-four character EBCDIC or ASCII set is that which is required for four minimum width continuous character elements.

8. The apparatus of claim 6 wherein the memory means selectively produces the unblanking bit groups of adjacent rows in overlapped time relation so as to selectively overlap adjacent character elements in adjacent rows of a displayed character to improve the character format.

9. The apparatus of claim 7 further comprising wherein the memory means selectively produces the unblanking bit groups of adjacent rows in overlapped time relation so as to selectively overlap adjacent elements in adjacent rows of a displayed character to improve the character format.

10. Apparatus for improving the clarity and density of displayed characters in a cathode ray tube character display system in which the character format is formed by an eight-wide row and N-high column coordinated matrix and characters to be displayed are built up row by row from discrete character elements which are identified within the matrix by character generating data bits applied to unblanking circuits in the display system, said apparatus cmprising memory means for producing character generating data bits only in groups of at least two consecutive unblanking bits, and means for controlling the application of the character generating data bits from the memory means to the unblanking circuits at a frequency rate in the order of four times the maximum Z-modulation frequency of the cathode ray tube character display system, thereby producing a continuous character element corresponding to each unblanking bit group.

* * * * *